(12) United States Patent
Hsu et al.

(10) Patent No.: US 9,316,891 B2
(45) Date of Patent: Apr. 19, 2016

(54) MICRO-PROJECTION SYSTEM

(71) Applicant: LITE-ON IT CORPORATION, Taipei (TW)

(72) Inventors: Cheng-Chung Hsu, Hsinchu (TW); Yu-Nan Tsai, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 180 days.

(21) Appl. No.: 14/210,477

(22) Filed: Mar. 14, 2014

(65) Prior Publication Data

US 2015/0160538 A1 Jun. 11, 2015

(30) Foreign Application Priority Data

Dec. 9, 2013 (CN) .......................... 2013 1 0664049

(51) Int. Cl.
*G03B 21/14* (2006.01)
*G03B 21/20* (2006.01)
*H01R 12/78* (2011.01)

(52) U.S. Cl.
CPC .......... *G03B 21/145* (2013.01); *G03B 21/2053* (2013.01); *H01R 12/78* (2013.01)

(58) Field of Classification Search
CPC ...... G03B 21/14; G03B 21/145; H01R 12/77; H01R 12/78; H01R 12/79; H01R 12/777
USPC ............ 353/39, 85, 98, 119, 122; 439/64, 99, 439/260, 372, 377, 492, 495, 499, 625
See application file for complete search history.

(56) References Cited

U.S. PATENT DOCUMENTS

| | | | | |
|---|---|---|---|---|
| 5,816,861 A | * | 10/1998 | Cheng .................. | H01R 13/631 439/653 |
| 2007/0178751 A1 | * | 8/2007 | Yamamoto ............. | H01R 12/79 439/495 |
| 2009/0186514 A1 | * | 7/2009 | Kato .................. | H01R 13/6275 439/372 |
| 2009/0273764 A1 | * | 11/2009 | D'Alessio ............... | G06F 1/266 353/85 |
| 2011/0285972 A1 | * | 11/2011 | Hu ....................... | G03B 21/145 353/85 |
| 2012/0307212 A1 | * | 12/2012 | Enomoto ............... | G03B 21/16 353/52 |

\* cited by examiner

*Primary Examiner* — Sultan Chowdhury
(74) *Attorney, Agent, or Firm* — Jianq Chyun IP Office

(57) ABSTRACT

A micro-projection system applied to a portable electronic device, comprising an optical engine, a control module, and a flat cable. The optical engine projects an image. The control module provides at least one control signal to control the optical engine. The flat cable is detachably connected to the optical engine and the control module respectively. Wherein, the optical engine and the control module are configured in the portable electronic device separately, and the flat cable has a corresponding configuration state for connecting the optical engine to the control module.

6 Claims, 2 Drawing Sheets

MICRO-PROJECTION SYSTEM

CROSS-REFERENCE TO RELATED APPLICATION

This application claims the priority benefit of China application serial no. 201310664049.2, filed on Dec. 9, 2013. The entirety of the above-mentioned patent application is hereby incorporated by reference herein and made a part of this specification.

BACKGROUND OF THE INVENTION

1. Field of the Invention

The present invention generally relates to a micro-projection system, and in particular, to a micro-projection system which can be applied to portable devices.

2. Description of Related Art

The micro-projection technology is applied to a portable device with advantages of light weight and small volume, such as a projection technology applied to mobile phones, digital cameras, notebooks, etc. According to the display technology, the micro-projection technology is mainly divided into a liquid crystal display (LCD) technology, a digital light processing (DLP) display technology, a liquid crystal on silicon (LCOS) display technology, and a micro electronic mechanical systems (MEMS) scanning display technology, etc.

Due to the internal space of a portable device is limited, the key point of designing the portable device is lay in how to properly assemble the micro-projection system and the internal circuit thereof so as to configure those in the internal space. And, since the micro-projection system is not the major circuit for the portable device, the design of the micro-projection system is usually requested to change for meeting the remaining space of the portable device. However, the different portable device may use different design of the micro-projection system as the remaining space changes, such that the design cost of the portable device may be enhanced.

SUMMARY

The present invention provides a micro-projection system which increases the commonality thereof.

The present invention provides a micro-projection system applied to a portable electronic device, and the micro-projection system includes an optical engine, a control module, and a flat cable. The optical engine projects an image. The control module provides at least one control signal to control the operation of the optical engine. The flat cable is detachably connected to the optical engine and the control module respectively. Wherein, the optical engine and the control module are configured in the portable electronic device separately, and the flat cable has a corresponding configuration state for connecting the optical engine to the control module.

In an embodiment of the present invention, the optical engine includes a light source module, an optical projection module, and at least one first connection port. The light source module is configured to generate an image light beam. The optical projection module is configured to project the image light beam on a projection surface to form the image. The at least one first connection port is electrically connected to the light source module and the optical projection module and is configured to transmit a driving control signal of the at least one control signal to the light source module and transmit a projection control signal of the at least one control signal to the optical projection module.

In an embodiment of the present invention, the control module comprises a projection control circuit and at least one second connection port. The projection control circuit is configured to provide the at least one control signal. The at least one second port is electrically connected to the projection control circuit and the flat cable and is configured to transmit the at least one control signal to the flat cable.

In an embodiment of the present invention, the flat cable has at least one first plug and at least one second plug. The at least one first plug is configured to electrically connect the at least one first connection port, and the at least one second plug is configured to electrically connect the at least one second connection port.

In an embodiment of the present invention, the at least one first connection port and the at least one second connection port have the same port style, and the at least first plug and the at least one second plug have the same plug style.

In an embodiment of the present invention, the flat cable has a first configuration state when a relative position between the optical engine and the control module is a first configuration relative position, and the flat cable has a second configuration state when the relative position between the optical engine and the control module have a second configuration relative position.

In an embodiment of the present invention, when the first configuration relative position is different from the second configuration relative position, the first configuration state is different from the second configuration state.

Based on the above, according to the micro-projection system of the embodiment of the present invention, the optical engine and the control module may be configured in the portable electronic device randomly, and the micro-projection system may be adapted to different configuration spaces without changing the design of the optical engine and the control module thereof through the property of the flat cable detachably connecting to the optical engine and the control module respectively and changing the configuration design of the flat cable for connecting the optical engine to the control module. Therefore, the commonality of the micro-projection system is enhanced, and the cost of changing design of the micro-projection system is reduced.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
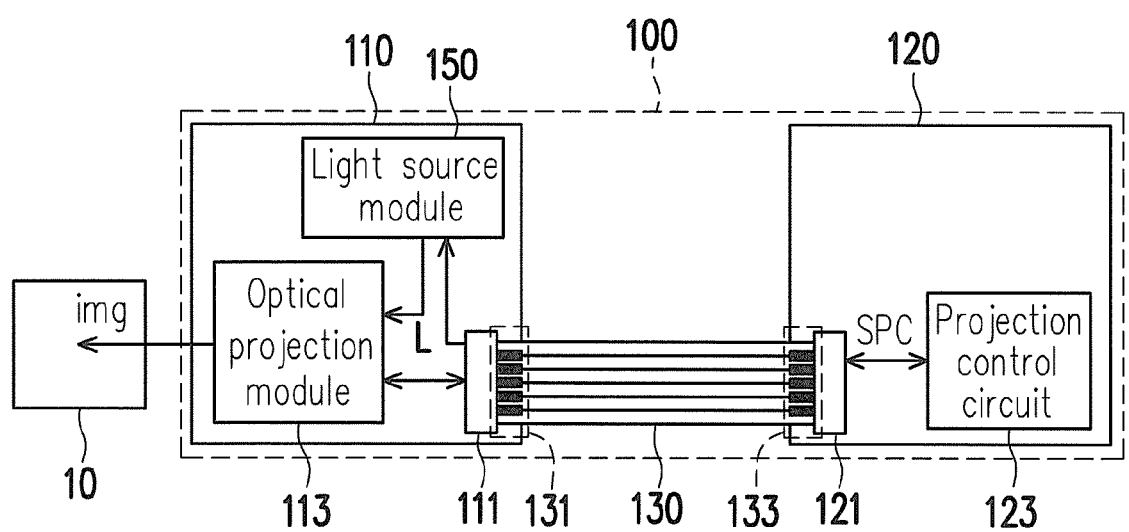
FIG. 1 is a system diagram illustrating a micro-projection system according to an embodiment of the present invention.

FIG. 1 is a system diagram illustrating a micro-projection system according to an embodiment of the present invention. Referring to FIG. 1, in the present embodiment, a micro-projection system 100 may be configured in a portable electronic device, and the micro-projection system 100 includes an optical engine 110, a control module 120, and a flat cable 130. The optical engine 110 is electrically connected to the control module 120 through the flat cable 130, and the flat cable 130 is detachably connected to the optical engine 110 and the control module 120 respectively. The control module 120 is configured to provide and transmit a plurality of control signals SPC to the optical engine 110 through the flat cable 130 to control the operation of the optical engine 110.

The optical engine 110 includes a light source module 150, an optical projection module 113, and a first connection port 111. The light source module 150 is configured to generate an image light beam to the optical projection module 113, and then the optical projection module 113 projects the image light beam on a projection surface 10 through internal optical elements thereof. The control module 120 includes a projection control circuit 123 and a second connection port 121. Wherein, the projection control circuit 123 is configured to provide the control signals SPC, and the control signals SPC includes a driving control signal of the light module 150 for controlling and driving the light source module 150 to generating an image light beam L and a projection control signal of the optical projection module 113 for controlling the optical projection module 113 to projecting the image light beam L on the corresponding position.

In the embodiment of the present invention, the optical engine 110 does not have control function and cannot operate independently, and the optical engine 110 is controlled by the control module 120. In other words, the optical engine 110 is non-workable alone. In the embodiment of the present invention, the optical engine 110 and the control module 120 may be configured in the portable electronic device randomly, and the optical engine 110 and the control module 120 are electrically connected to each other through the design of the connection ports and the flat cables. The following will further illustrate the design of the connection ports and the flat cables.

In the present embodiment, the optical engine 110 has a first connection port 111, and the control module 120 has a second connection port 121. The flat cable 130 has a first plug 131 and a second plug 133, wherein the first plug 131 is configured to electrically connect the first connection port 111 and the second plug 133 is configured to electrically connect the second connection port 121. Based on the above, the optical engine 110 is electrically connected to the control module 120 through the first connection port 111, the flat cable 130, and the second connection port 121 to receive the control signals SPC provided by the control module 120, and the optical engine 110 drives the light source module 150 and controls the optical projection module 113 according to the control signals SPC to project an image img on the projection surface 10.

In the present embodiment, the first connection port 111 and the connection second port 121 have the same port style, and the first plug 131 and the second plug 133 have the same plug style. In an embodiment, the first connection port 111 and the second connection port 121 may be flat cable sockets, and the first plug 131 and the second plug 133 are pins plugs to plug in the flat cable sockets. In another embodiment, the first connection port 111 and the second connection port 121 may be any style of female connectors, and the first plug 131 and the second plug 133 may be a corresponding style of sub connectors. According to the design described above, the flat cable 130 is detachably connected between the optical engine 110 and the control module 120. Hence, the configuration of the flat cable 130 may have the different variations for adapting to the different configuration spaces. Therefore, the commonality of the micro-projection system 100 may be enhanced, and the cost of changing design of the micro-projection system 100 is reduced.

Besides, in the present embodiment, the numbers of first port 111 and second port 121 are one respectively, taken as an example. But, in other embodiments, the number of the first port 111 and the second port 120 may be more than one respectively. And, the number of the first plug 131 and the second plug 133 may be changed according to the number of the first port 111 and the second port 121 respectively, but the present invention is not limited thereto.

According to the design of the connection ports and the flat cables, the optical engine 110 and the control module 120 may be configured in the portable electronic device randomly. Furthermore, in the first portable electronic device, a relative position between the optical engine 110 and the control module 120 has a first configuration relative position, and the flat cable 130 has a first configuration state; a relative position between the optical engine 110 and the control module 120 has a second configuration relative position, and the flat cable 130 has a second configuration state in the second portable electronic device. Wherein, the first configuration state is different from the second configuration state, and/or the first configuration relative position is different from the second configuration relative position.

Figure 2A:
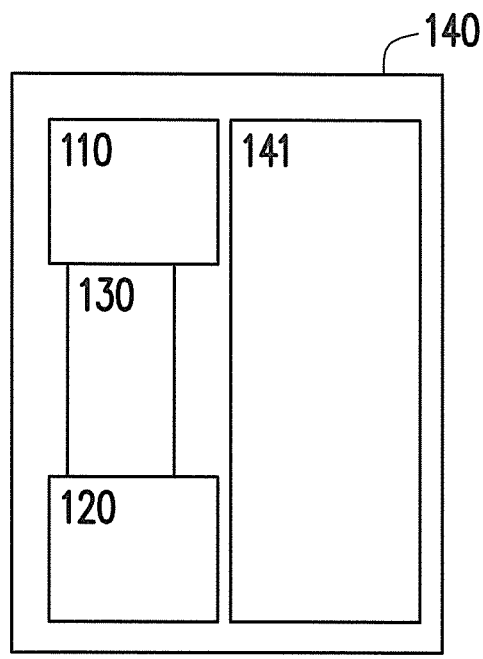
FIGS. 2A and 2B are configuration diagrams illustrating a micro-projection system applied in a portable electronic device according to an embodiment of the present invention.
Figure 2B:
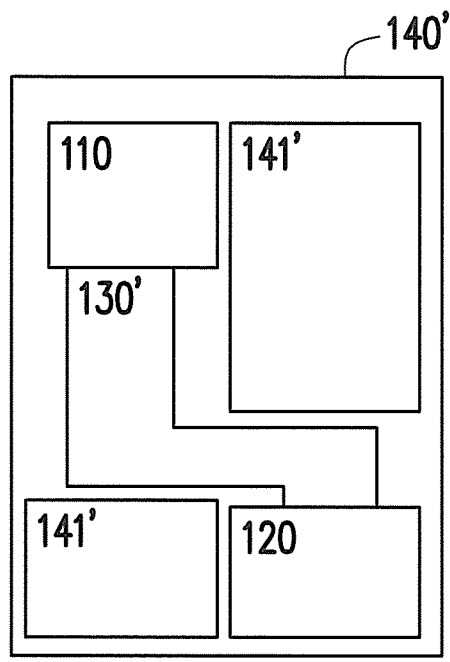

FIGS. 2A and 2B are configuration diagrams illustrating a micro-projection system applied in a portable electronic device according to an embodiment of the present invention. Referring to FIG. 2A, the original internal component 141 of the first portable electronic device 140 is mainly configured on the right side of the first portable electronic device 140, and the space of the left side of the first portable electronic device 140 may be configured to dispose the micro-projection system 100. The relative position between the optical engine 110 and the control module 120 of the micro-projection system 100 is a first configuration relative position. And, the optical engine 110 is located in the top left side of the first portable electronic device 140 and the control module 120 is located in the bottom left side of the first portable electronic device 140, the configuration relative position of the optical engine 110 and the control module 120 as shown in FIG. 2A. The flat cable 130 has a first configuration state, and the flat cable 130 is a straight bar configuration and both ends thereof are connected to the optical engine 110 and the control module 120 respectively, as shown in FIG. 2A. Then, referring to FIG. 2B, the original internal components 141' of the second portable electronic device 140' is mainly configured in top right side and bottom left side of the second portable electronic device 140', and the remaining spaces of top left side and bottom right side of the second portable electronic device 140' is configured to dispose the micro-projection system 100. The relative position between the optical engine 110 and the control module 120 of the micro-projection system 100 is a second configuration relative position, and the optical engine 110 is located in top left side of the second portable electronic device 140' and the control module 120 is located in bottom right side of the second portable electronic device 140', the configuration relative position of the optical engine 110 and the control module 120 as shown in FIG. 2B. The flat cable 130' has a second configuration state, and the flat cable 130' is a S type configuration and both ends thereof are connected to the optical engine 110 and the control module 120 respectively, as shown in FIG. 2B.

In the embodiment of the present invention, the micro-projection system 100 is divided into two independent units, i.e. the optical engine 110 and the control module 120, which may be respectively configured in different positions corresponding to the remaining configuration spaces of the portable electronic device, and the optical engine 110 is electrically connected to the control module 120 through the flat cable 130 with the corresponding configuration design, so that the control module 120 provides control signals SPC to the optical engine 110 to control the operation of the optical engine 110. As a result, the micro-projection system 100 is only needed to change the configuration design of the flat cable 130 without changing the design of the optical engine 110 and the control module 120 thereof for the different remaining configuration spaces of the portable electronic devices. And, the micro-projection system 100 may have multiple configurations through the property of the flat cable 130 which is detachably connected with the optical engine 110 and the control module 120 respectively.

To sum up, according to the micro-projection system of the embodiment of the present invention, the optical engine and the control module may be configured in the portable electronic device randomly, and the micro-projection system may be adapted to different configuration spaces without changing the design of the optical engine and the control module thereof through the property of the flat cable detachably connecting to the optical engine and the control module respectively and changing the configuration design of the flat cable for connecting the optical engine to the control module. Therefore, the commonality of the micro-projection system may be enhanced, and the cost of changing design of the micro-projection system is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A micro-projection system applied to a portable electronic device, comprising:
   an optical engine projecting an image, wherein the optical engine comprises a light source module configured to generate an image light beam, an optical projection module configured to project the image light beam on a projection surface to form the image, and at least one first connection port electrically connected to the light source module and the optical projection module;
   a control module providing at least one control signal to control the optical engine; and
   a flat cable detachably connected to the optical engine and the control module respectively;
   wherein the optical engine and the control module are configured in the portable electronic device separately, and the flat cable has a corresponding configuration state for connecting the optical engine to the control module,
   wherein the at least one first connection port is configured to transmit a driving control signal of the at least one control signal to the light source module and transmit a projection control signal of the at least one control signal to the optical projection module.

2. The micro-projection system according to claim 1, wherein the control module comprises:
   a projection control circuit configured to provide at least one control signal; and
   at least one second connection port electrically connected to the projection control circuit and the flat cable, and configured to transmit the at least one control signal to the flat cable.

3. The micro-projection system according to claim 2, wherein the flat cable has at least one first plug and at least one second plug, the at least one first plug is electrically connected to the at least one first connection port and the at least one second plug is electrically connected to the at least one second connection port.

4. The micro-projection system according to claim 3, wherein the at least one first connection port and the at least one second connection port have the same port style, and the at least first plug and the at least one second plug have the same plug style.

5. A micro-projection system applied to a portable electronic device, comprising:
   an optical engine projecting an image;
   a control module providing at least one control signal to control the optical engine; and
   a flat cable detachably connected to the optical engine and the control module respectively;
   wherein the optical engine and the control module are configured in the portable electronic device separately, and the flat cable has a corresponding configuration state for connecting the optical engine to the control module,
   wherein the flat cable has a first configuration state when a relative position between the optical engine and the control module is a first configuration relative position in the portable electronic device, and the flat cable has a second configuration state when the relative position between the optical engine and the control module have a second configuration relative position in the portable electronic device.

6. The micro-projection system according to claim 5, wherein when the first configuration relative position is different from the second configuration relative position, the first configuration state is different from the second configuration state.

* * * * *